March 4, 1941.  L. A. DUNAJEFF  2,233,592
RESILIENT SHEET
Filed July 21, 1938  2 Sheets-Sheet 1

LEONID A. DUNAJEFF
INVENTOR.

BY John P. Niconow
ATTORNEY.

March 4, 1941.　　　L. A. DUNAJEFF　　　2,233,592
RESILIENT SHEET
Filed July 21, 1938　　　2 Sheets-Sheet 2
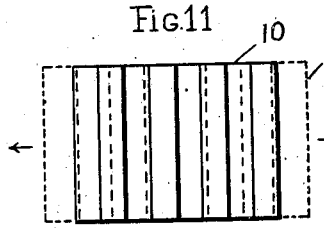
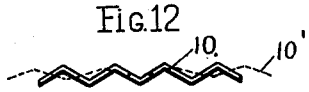
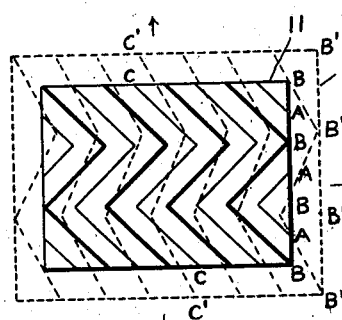
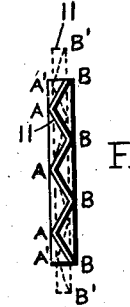
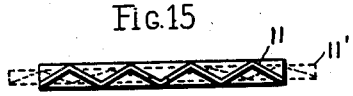
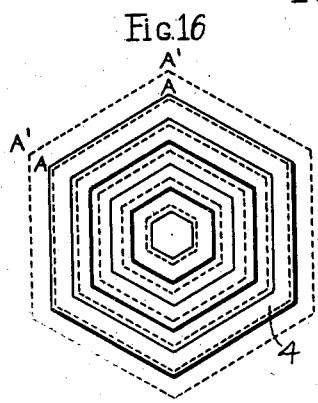
LEONID A. DUNAJEFF
INVENTOR.
ATTORNEY Patented Mar. 4, 1941

2,233,592

UNITED STATES PATENT OFFICE 2,233,592

RESILIENT SHEET

Leonid A. Dunajeff, New York, N. Y., assignor to Commercial Ingredients Corporation, New York, N. Y.

Application July 21, 1938, Serial No. 220,490

2 Claims. (Cl. 29—180)

My invention relates to resilient sheets and has particular reference to sheets rendered resiliently expansive in all or preferred directions.

My invention has for its object to provide a sheet having a property to be stretched laterally by the application of lateral or transverse forces, returning to the original shape after removal of the forces. For this purpose I make my sheets of a material inherently possessing sufficient hardness or rigidity and resiliency so as to enable the sheet to return to its original shape after deformation, and I further increase the resilient stretchability of the sheet by folding it into a plurality of corrugations or folds extending in various directions throughout the sheet. The corrugations for this purpose may be preferably made with ridges curved lengthwise in lateral or transverse directions and may extend in zig-zag lines along the sheet alongside each other, it being desirable to avoid crossings between the corrugations. The corrugations may form groups of more or less uniformly repeating patterns throughout the sheet. The shape of the corrugations must be such as to permit of their resilient flexure so as to render the sheet laterally expansive. Any stress, therefore, to which the sheet or its portion may be subjected will be absorbed by the resilient deformation of the corrugations or their straightening or flattening out, which may be accompanied by the straightening of the curved lines of the ridges of the corrugations, or widening of the angles between the sides of the corrugations or between the sides of the zig-zag lines of the ridges.

I prefer to make my resilient sheet of steel or other suitable resilient metal, although for various specific applications other materials may be used such as celluloid, fiber, paper, rubber of various degrees of hardness, etc., the only condition being that the material should be sufficiently resilient to recover its shape and its corrugations after having been subjected to strains not exceeding its elastic limit.

With properly selected resilient material for the sheet and properly designed and proportioned corrugations, the sheet will return to its original shape and will recover its projected area upon removal of the applied forces. Such a sheet will resiliently respond to forces applied in its plane or transversely thereto, in the latter case the deformation being expressed in the transverse depression of the sheet with the corresponding expansion of its area. Such deformations may take place when, for instance, the sheet is used as a resilient seat for a chair or similar article of furniture, for bedsprings etc.

The zig-zag lines of the corrugations may be considered as supplementary corrugations in the plane of the sheet, the primary corrugations extending transversely to the sheet. Other additional corrugations may be added, as for instance, by forming large corrugations with impressed transverse corrugations, the section of the sheet at such a point resembling a low frequency wave with high frequency oscillations impressed thereon.

Certain typical forms of my invention are described in the accompanying specification and drawings in which—

Fig. 11 is a plan view of a sheet with straight corrugations.

Fig. 12 is an end view of the same.

Fig. 13 is a plan view of a corrugated sheet.

Fig. 14 is an end view of the same.

Fig. 15 is a side view of the same.

Fig. 16 is a plan view of hexagonal corrugations.

Fig. 17 is an end view of the same.

Figs. 18, 19, 20 and 21 are end views of different types of corrugations.

Figure 3:
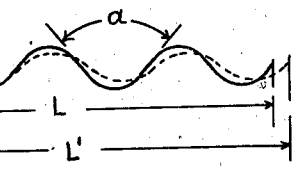
Fig. 3 is a diagrammatic view showing the effect of a longitudinal strain on the corrugations.

Corrugated resilient sheets made in accordance with my invention may have different forms, shapes and patterns of the corrugations, and only a few typical forms are shown in the accompanying drawings. The principal idea is illustrated in Fig. 3 which diagrammatically represents a sectional line across corrugations 1, its shape after deformation being shown in dotted lines. It is evident that the distance L between the edges of the sheet is materially shorter than the length of the surface over the corrugations between the same points. This additional length is utilized for absorbing stresses by allowing the sheet to resiliently stretch in direction of application of forces.

The resilient stretchability is obtained, therefore, by corrugating a substantially solid sheet without perforations. The sheet may have, of course, perforations for structural purposes, for fastening to supporting structures, etc., but no perforations are required for rendering the sheet stretchable.

The sheet becomes stretched to the length L' under action of a force in direction across the corrugations, all this added length being derived from the flattening of the corrugations, resulting from the bending of their walls, as shown in dotted lines, or widening of the angles "a" and spreading the corrugations farther apart.

The sheet, in order to be expansive in all directions, must have corrugations extending in different directions along angular lines, zig-zag shaped, for instance, so that for any direction of the applied forces there will be a number of corrugations extending more or less transversely to these forces. The angle "a" will, of course, more or less vary for different angles between the corrugations and direction of forces.

Figure 1:
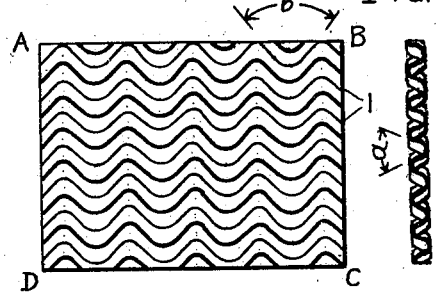
Fig. 1 is a plan view of a sheet with double corrugations.
Figure 2:
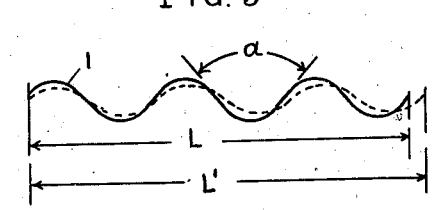
Fig. 2 is an end view of the sheet.

One of the types of corrugated sheets is shown in Figs. 1 and 2. It has corrugations or folds 1 extending side by side or parallel to each other throughout the length of the sheet, covering all its portions. These corrugations represent gathering of the sheet in folds in the direction between the sides AB and DC, the tops and bottoms of the corrugations lying in two parallel planes. These corrugations render the sheet laterally expansive in direction between the edges AB and DC. In order to impart resiliency in direction between the edges AD and BC or at right angles to the direction between AB and DC, thereby rendering the sheet resiliently expansive in all directions, it is provided with a second set of corrugations by forming the primary corrugations 1 in zig-zag or wave-like lines with angles "b" between the sides of the corrugations. These secondary corrugations represent further gathering of the material of the sheet lengthwise so that it can be stretched in that direction. The sheet can be then resiliently stretched in any direction.

The elongation is obtained at the expense of flattening and spreading out of the corrugations with the widening of the angles "a" and "b". Upon removal of the forces, the corrugations will resiliently return to their original form, the material being inherently resilient.

For comparison, a sheet 10 corrugated lengthwise only is shown in Fig. 11. Such a sheet can expand in one direction only as shown in dotted lines 10', being substantially rigid or inexpansible in direction of its width.

A doubly corrugated sheet 11 is shown diagrammatically in Figs. 13, 14 and 15, the dotted lines 11' indicating the sheet in the expanded condition. It may be seen that the expansion is obtained at the expense of straightening out of the corrugations and flattening of the sheet so that its effective thickness is reduced as shown in dotted lines in Figs. 14 and 15.

Figure 4:
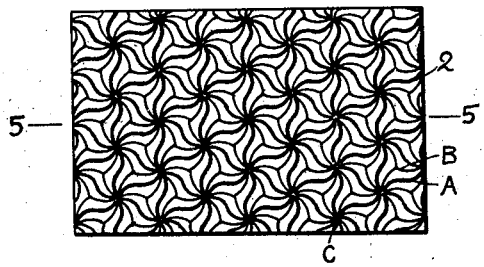
Fig. 4 is a plan view of a sheet with star-shaped corrugations.
Figure 5:
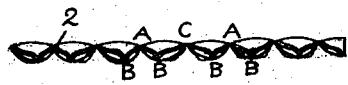
Fig. 5 is a sectional view taken on the line 5—5 of Fig. 4.

Another form of my corrugated sheet is shown in Figs. 4 and 5. The corrugations 2 extend in zig-zag or curved lines, the tops and bottoms of the corrugations lying in two parallel planes. The zig-zag lines cross each other, defining central points of hexagonal patterns uniformly distributed throughout the sheet. Stretching of any portion of the sheet will result in straightening of the curved corrugations between the central points, thereby widening the area covered by the hexagonal group of corrugations, this widening being extended in varying degree to the other groups so that the whole sheet will resiliently yield in the direction of the applied force. The sheet is, therefore, expansive in all directions even if its edges are rigidly held in a frame. The widening of the corrugations will be expressed in the increase of distances between the points A, A at one side and points B, B at the other side, the line A—A approaching the line B—B.

Figure 6:
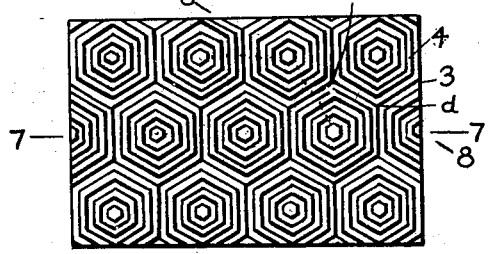
Fig. 6 is a plan view of a sheet with hexagonal corrugations.
Figure 7:
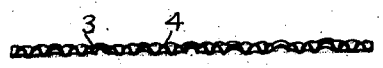
Fig. 7 is a sectional view taken on the line 7—7 of Fig. 6.
Figure 8:
Fig. 8 is an enlarged sectional view taken on the line 8—8 of Fig. 6.

Another modification is shown in Figs. 6, 7 and 8, the corrugations in this case being of two principal types: corrugations 3, extending in zig-zag lines lengthwise and crosswise on the sheet, and corrugations 4 forming closed honeycomb-shaped hexagonal patterns enclosed between the zig-zag corrugations. Appearing in the plan view as straight, the sides of the hexagons and the straight portions of the zig-zag corrugations are curved in the transverse planes as shown in Figs. 7 and 8 so that the hexagons can expand or contract under action of lateral or transverse forces, or to be deformed under pressure from the zig-zag corrugations when the latter resiliently expand under action of applied forces.

Tension applied to any part of the sheet will cause resilient stretching of the zig-zag shaped corrugations enclosed between the corners of the zig-zag lines. The corrugations will return to their original shape upon removal of the stresses. The hexagonal corrugations are shown in detail in Figs. 18 and 19, the normal shape being shown in full lines and the expanded position in corresponding dotted lines. The expansion of the area occupied by the corrugations will involve broadening of the primary corrugations 4 and also corresponding broadening of the secondary corrugations 3'.

Figure 9:
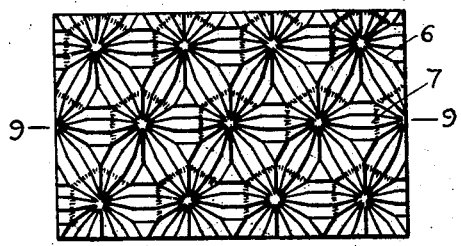
Fig. 9 is a plan view of a sheet with modified corrugations.
Figure 10:
Fig. 10 is a sectional view taken on the line 10—10 of Fig. 9.

Another modification is shown in Figs. 9 and 10. The sheet has corrugations 6 also forming hexagonal patterns but extending transversely to the sides of the hexagons or radially toward the central points of the hexagons. The sides of the hexagons have radial corrugations 6 forming continuations of the parallel corrugations 7 extending transversely to the sides. Additional zig-zag lines are formed in the plane transverse to the plane of the corrugations 6 and 7 by depressing the central portions of the hexagonal patterns as shown in Fig. 9. These transverse corrugations or zig-zag shaped folds extend in all directions, imparting resilient stretchability to the sheet.

It is understood that my invention can be applied to a variety of other forms of corrugated sheets, the structures described being set forth only by the way of examples, the important characteristics of my resilient sheets being that they must have corrugations extending in various directions and in such manner that there should not be any long stretches of a flat material not crossed by corrugations, and that the corrugations must be arranged so as to be free to bend or change their angle. The material itself must be sufficiently resilient to recover its shape after being subjected to deformations.

My new type of compounded corrugations can be applied not only to solid sheet but also to suitably perforated sheets and even to sheets formed of wire mesh. Such materials can be also considered substantially solid if the perforations or clearances between the wires have no effect on the stretchability of the product.

As it was shown, the singly corrugated sheet, Fig. 11, cannot be stretched transversely, there being no material stored in corrugation in that direction. For the same reason, any corrugations which do not involve the whole width and length of the sheet, cannot add to its resiliency. Merely a series of depressions or pressed out ridges will tend to render the sheet more rigid instead of adding to its stretchability.

It is possible, however, to make such a sheet expansible by removing the metal around the joints between the crossing corrugations thereby permitting of independent stretching in either direction. Such a structure has been disclosed in my patent application Serial No. 142,630, filed May 17, 1937 which matured into Patent No. 2,158,929. Similarly separate depressions or projections 15 will not make the sheet stretchable since they are locked between solid portions or rings of unstretchable metal.

My sheets, in addition to being applicable for making resilient furniture seats, can be also used for making containers with flexible resilient walls, resiliently yielding to external or internal forces but recovering their shape upon removal of such forces.

My resilient sheets can be made of hard steel for use in making military helmets, protective plates for the guns, etc., where they can effectively resist shocks by resiliently yielding at the points of impact. They can be also used in the form of resilient bulkheads or "stiffening webs" on the ships, back of the hull plates, where such webs can resist the force of explosion of a submerged torpedo, thereby effectively protecting the ship. It is understood therefore that the term "sheet" as used in this specification also includes plates of any ordinary thickness which can be provided with the suitable corrugations.

The shape of corrugations may vary in accordance with various practical applications as shown in Figs. 20 to 23 inclusive. Certain types of corrugations like those shown in Fig. 21 possess an added advantage in that they are individually resilient and flexible in direction transverse to the plane of the sheet as shown in dotted lines in Fig. 22.

I claim as my invention:

1. A sheet of imperforate material rendered simultaneously stretchable in all directions by being folded into a plurality of groups of hexagonal corrugations, the corrugations following paths of varying directions.

2. A sheet of imperforate material rendered simultaneously stretchable in all directions by being folded into a plurality of groups of closely spaced corrugations forming closed contours, the corrugations following paths of varying directions, with corrugations between the groups formed in different planes and following zig-zag paths.

LEONID A. DUNAJEFF.